US012726262B2

(12) United States Patent
Patel et al.

(10) Patent No.: US 12,726,262 B2
(45) Date of Patent: Sep. 1, 2026

(54) GENERATING SATELLITE ASSIGNMENT INSTRUCTIONS FOR FULFILLING CONNECTION REQUESTS DURING A MASS GATHERING EVENT

(71) Applicant: International Business Machines Corporation, Armonk, NY (US)

(72) Inventors: Kushal S. Patel, Pune (IN); Gandhi Sivakumar, Bentleigh (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 18/120,032

(22) Filed: Mar. 10, 2023

(65) Prior Publication Data

US 2024/0305362 A1 Sep. 12, 2024

(51) Int. Cl.
*H04B 7/185* (2006.01)

(52) U.S. Cl.
CPC ................................ *H04B 7/18513* (2013.01)

(58) Field of Classification Search
CPC .................... H04B 7/185–195; H04B 7/18513
See application file for complete search history.

(56) References Cited

U.S. PATENT DOCUMENTS 11,336,364 B1 5/2022 Masoomzadeh
2005/0095982 A1* 5/2005 Blanchard ............ H04B 7/2126 455/12.1
2018/0234166 A1* 8/2018 Peponides ........... H04W 72/046
2019/0244348 A1* 8/2019 Buckler ................ G06T 7/0012
2020/0008079 A1* 1/2020 Halsey ............... H04B 7/18508
2021/0136641 A1 5/2021 Roy et al.
(Continued)

FOREIGN PATENT DOCUMENTS

WO 2021221736 A2 11/2021

OTHER PUBLICATIONS

Condon, S., "CES 2019: Verizon showcases the potential of 5G with drones, Disney and more," ZDNET, Jan. 8, 2019, 7 pages, retrieved from https://www.zdnet.com/article/ces-2019-verizon-showcases-the-potential-of-5g-with-drones-disney-and-more/.
(Continued)

*Primary Examiner* — Raymond S Dean
(74) *Attorney, Agent, or Firm* — Michael A. Petrocelli

(57) ABSTRACT

A computer-implemented method, according to one embodiment, includes obtaining satellite information associated with a plurality of satellites, and using the satellite information to determine physical parameters associated with the satellites as the satellites pass over geographical areas. The method further includes determining, from data associated with a plurality of internet based resources, a future gathering event at a first geographical area in which a plurality of connection requests will be output from user devices located at a first geographical area. Furthermore, the method includes generating, based on the physical parameters and the data, assignment instructions that specify which of the satellites is to accept the plurality of connection requests from the first geographical area during the gathering event. The assignment instructions are output for preventing the connection requests from going unfulfilled during the gathering event.

20 Claims, 6 Drawing Sheets

(56) References Cited

U.S. PATENT DOCUMENTS

| | | | | |
|---|---|---|---|---|
| 2021/0281331 A1* | 9/2021 | Boutigny | ............... | H04B 17/12 |
| 2022/0225201 A1 | 7/2022 | Rezaee et al. | | |
| 2023/0209417 A1* | 6/2023 | Bharadwaj | ......... | H04B 7/18541<br>370/331 |

OTHER PUBLICATIONS

Tasevski, S., "5G and Drones," DroneBelow.com, Aug. 31, 2018, 2 pages, retrieved from https://dronebelow.com/2018/08/31/5g-and-drones/.

Samsung, "Samsung, Cisco and Orange Demonstrate 5G-Powered Drone and Industrial Robot at MWC19," Samsung Newsroom, Feb. 26, 2019, 5 pages, retrieved from https://news.samsung.com/global/samsung-cisco-and-orange-demonstrate-5g-powered-drone-and-industrial-robot-at-mwc19.

Patel, N., "The Sky Is the Limit in 5G Game of Drones," elnfochips, Dec. 11, 2019, 7 pages, retrieved from https://www.einfochips.com/blog/sky-limit-5g-game-drones/.

Mehar, P, "Nasa Is About to Test a Giant Solar Drone That Broadcasts 5G," Tech Explorist, Mar. 9, 2019, 4 pages, retrieved from https://www.techexplorist.com/nasa-test-giant-solar-drone-broadcasts-5g/21473/.

Tangerman, V., "Nasa Is About to Test a Giant Solar Drone That Broadcasts 5G," The-Byte, Mar. 8, 2019, 6 pages, retrieved from https://futurism.com/the-byte/aerovironment-softbank-5g-drone-uav.

* cited by examiner

CLIENT COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

ASSIGNMENT DETERMINATION MODULE 150

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

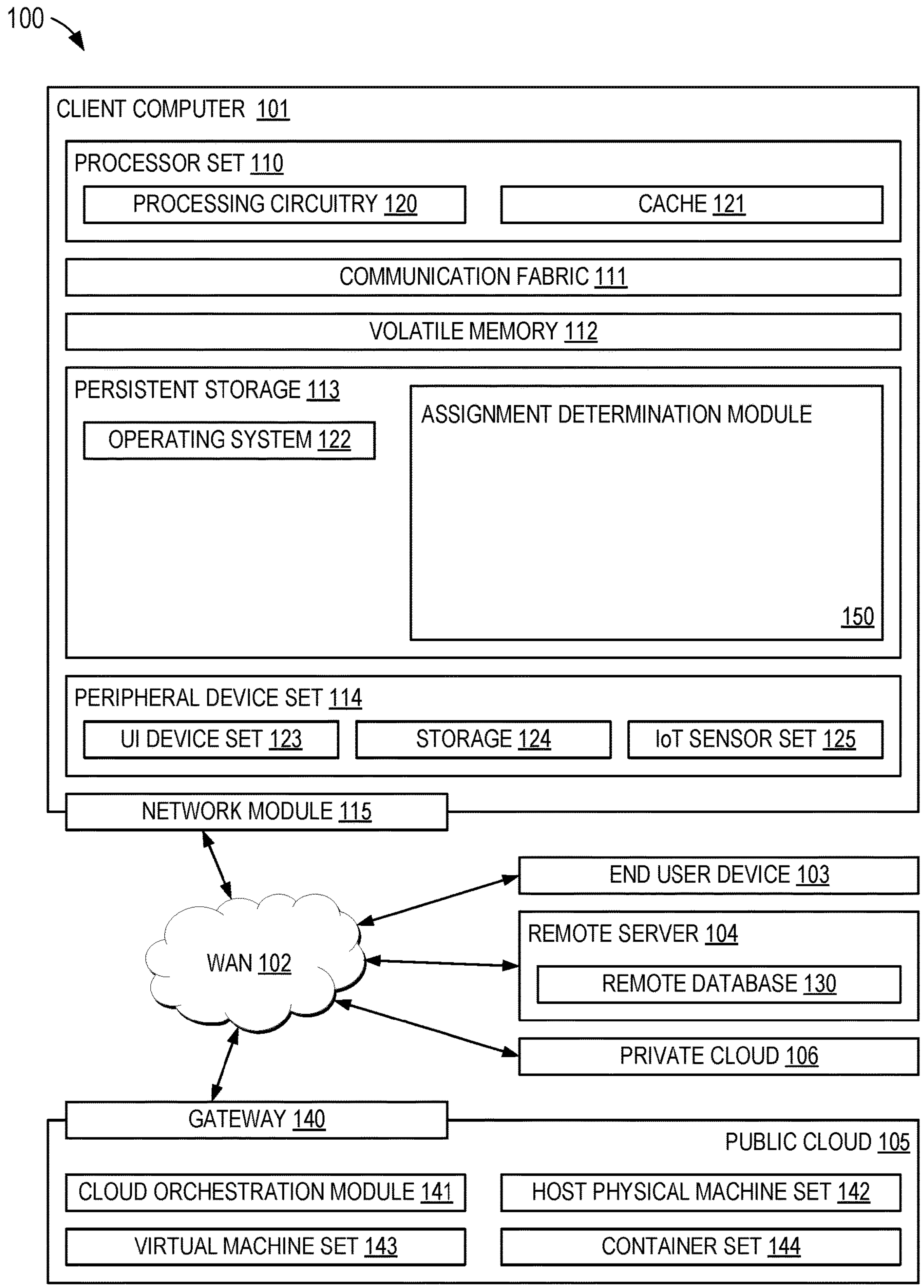

FIG. 1

GENERATING SATELLITE ASSIGNMENT INSTRUCTIONS FOR FULFILLING CONNECTION REQUESTS DURING A MASS GATHERING EVENT

BACKGROUND

The present invention relates to connection requests, and more specifically, this invention relates to generating assignment instructions that specify which satellites are to accept connection requests from a geographical area during a mass gathering event.

Communication networks typically include a plurality of communication devices that communicate with other communication devices via wireless signals. For example, communication devices may include, e.g., computers, cellular phones, fax machines, network enabled tablets, etc. These wireless signals are sometimes relayed via communication relay devices on the Earth's surface, e.g., ground antennas, routers, modems, etc. In some cases, these wireless signals may additionally and/or alternatively be transmitted via connection requests that are output from communication devices to satellites.

Cloud providers, e.g., such as corporations, establish relationships with satellite companies in some cases in order to achieve two distinctly different objectives. For example, commercial satellite constellations generate relatively extensive amounts of data that needs to be stored, processed, and analyzed. This makes these satellite companies prime customers for the cloud providers. Meanwhile, the expansion of edge computing beyond traditional terrestrial network connections drives direct connections between data centers and satellite broadband ground stations to reduce latency and increase application speeds.

SUMMARY

A computer-implemented method, according to one embodiment, includes obtaining satellite information associated with a plurality of satellites, and using the satellite information to determine physical parameters associated with the satellites as the satellites pass over geographical areas. The method further includes determining, from data associated with a plurality of internet based resources, a future gathering event at a first geographical area in which a plurality of connection requests will be output from user devices located at a first geographical area. Furthermore, the method includes generating, based on the physical parameters and the data, assignment instructions that specify which of the satellites is to accept the plurality of connection requests from the first geographical area during the gathering event. The assignment instructions are output for preventing the connection requests from going unfulfilled during the gathering event.

A computer program product, according to another embodiment, includes a computer readable storage medium having program instructions embodied therewith. The program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

DETAILED DESCRIPTION

Figure 2:
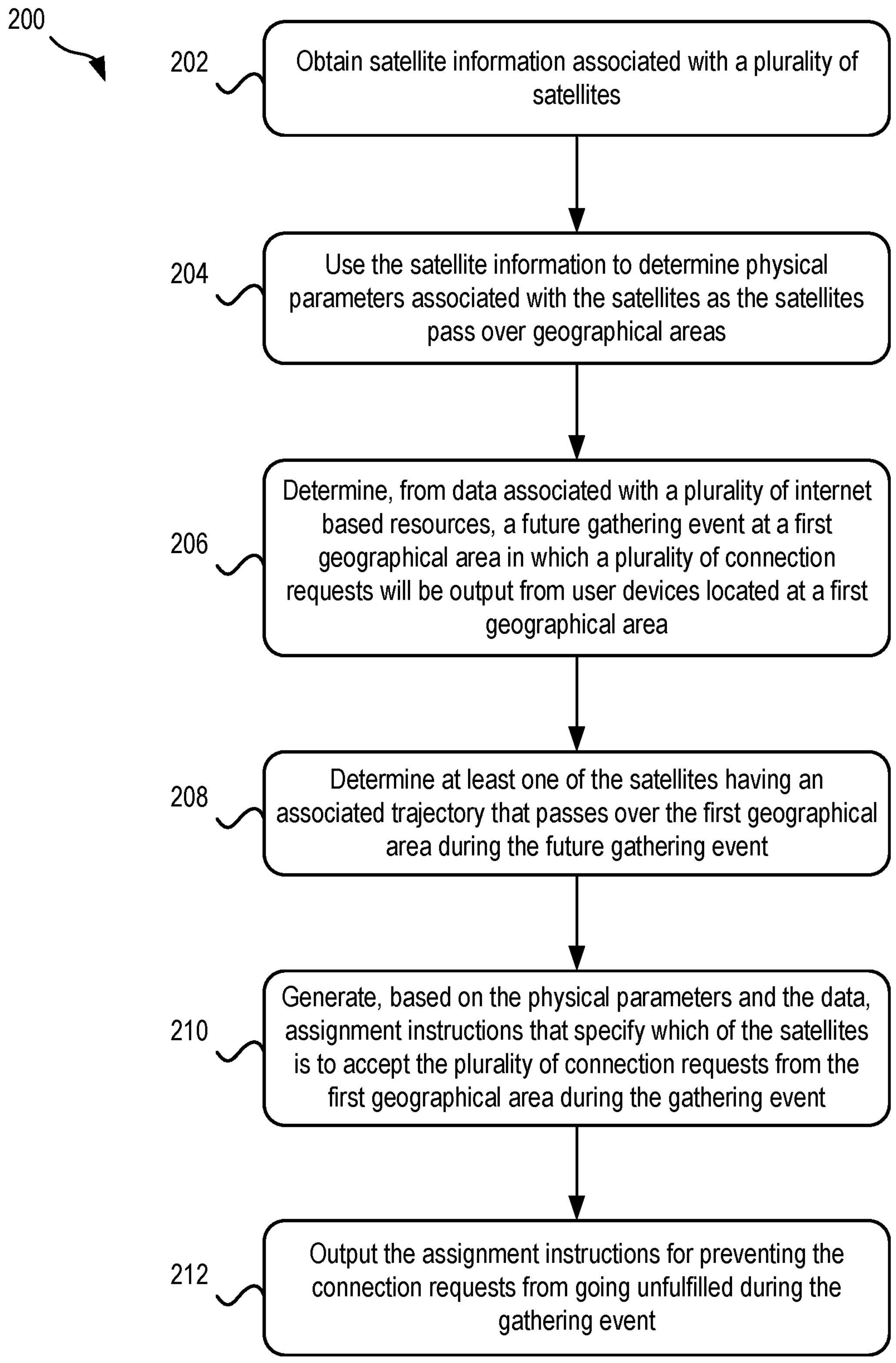
FIG. 2 is a flowchart of a method, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for generating assignment instructions that specify satellites to accept connection requests from a geographical area during a mass gathering event.

In one general embodiment, a computer-implemented method includes obtaining satellite information associated with a plurality of satellites, and using the satellite information to determine physical parameters associated with the satellites as the satellites pass over geographical areas. The method further includes determining, from data associated with a plurality of internet based resources, a future gathering event at a first geographical area in which a plurality of connection requests will be output from user devices located at a first geographical area. Furthermore, the method includes generating, based on the physical parameters and the data, assignment instructions that specify which of the satellites is to accept the plurality of connection requests from the first geographical area during the gathering event. The assignment instructions are output for preventing the connection requests from going unfulfilled during the gathering event.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as assignment determination module of block 150 for generating assignment instructions that specify satellites to accept connection requests from a geographical area during a mass gathering event. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, communication networks typically include a plurality of communication devices that communicate with other communication devices via wireless signals. For example, communication devices may include, e.g., computers, cellular phones, fax machines, network enabled tablets, etc. These wireless signals are sometimes relayed via communication relay devices on the Earth's surface, e.g., ground antennas, routers, modems, etc. In some cases, these wireless signals may additionally and/or alternatively be transmitted via connection requests that are output from communication devices to satellites.

Cloud providers, e.g., such as corporations, establish relationships with satellite companies in some cases in order to achieve two distinctly different objectives. For example, commercial satellite constellations generate relatively extensive amounts of data that needs to be stored, processed, and analyzed. This makes these satellite companies prime customers for the cloud providers. Meanwhile, the expansion of edge computing beyond traditional terrestrial network connections drives direct connections between data centers and satellite broadband ground stations to reduce latency and increase application speeds.

Satellites typically orbit the Earth in order to assist in the communication networks, such as those described above. An altitude at which a satellite orbits the Earth may depend on the type and components of a satellite. For example, a low Earth orbit (LEO) is, as the name suggests, an orbit that is relatively close to the Earth's surface. For example, these orbits are typically performed at an altitude of less than 1000 kilometers (km) but may be as low as 160 km above the Earth's surface. This is relatively low compared to the orbits of other satellites, but still relatively very far above the Earth's surface. Unlike satellites in geostationary orbit (GEO) that must always orbit along the Earth's equator, LEO satellites do not always follow a particular path around the Earth in the same way. Rather a plane of an orbit may be tilted with respect to the equator, and therefore there are relatively more available routes for satellites in LEO.

Use of satellites for fulfilling connection requests within a communication network fails to forward consider relative degrees of communication traffic that will be experienced by satellites. For example, as a result of a planned event occurring in a certain geographical location, relatively more data transfer and/or burst data transfer is experienced throughout a timeline of the event. According to a more specific example, a parade procession may be planned for celebrating an event on a given day, and the parade may occur within a given geographical area, e.g., from a first location to a second location between 10:00 AM to 12:00 PM. In another example, a certain target induced timeline where uninterrupted connection continuation is relatively important may exist. Based on these events, e.g., mass gathering events and/or planned notification for an uninterrupted connectivity requirement, a communication network may experience relatively more data connection requests from targets at such events than would otherwise typically occur. Because conventional communication networks fail to anticipate such events and/or incorporate such events into plans for fulfilling connection requests, at least some connection requests originating from such events fail. In some cases, this results in customers receiving connection request failure notices. In some other cases, this results in data associated with a customer's connection request not reaching a target destination, while the customer may be unaware of such a failure. This results in customer dissatisfaction. Furthermore, a compounding problem begins in which connection requests are re-sent, resulting in relatively even more network traffic and computer operations being performed and failing, e.g., burst data transfer on a compounding scale.

Because conventional techniques fail to detect such mass gatherings and user induced connectivity requirements, selection of a satellite for processing connection requests is typically merely routed to available satellites. This is problematic when, for example, two satellites are currently orbiting over a geographical area and have an overlapping footprint region and area of inference. In such an example, it is likely that one of the satellites, which has relatively more coverage, will receive the connection request. Typically, such a satellite processes the connection, and all the data exchange occurs through that engine. In such cases, if there is a planned procession or an event requiring uninterrupted service and the handover to another satellite creates a disconnect for a current dedicated traffic channel (DTCH), then there is no way by which this connection can be created based on a timeline expectation and satellite mapping. Furthermore, conventional communication network techniques fail to locate satellite trajectory timelines, and therefore fail to map satellites to an event and/or allocate (or forward) target connection requests to a satellite where handover should be avoided or reduced.

In sharp contrast to the deficiencies of the conventional techniques described above, the techniques of various embodiments and approaches described herein work with remote target initiators, understand requirements of data transfer timelines, gather the information about mass gathering events and accordingly select a satellite connection processing location based on an analysis of trajectory footprints of all the satellites in the inference region. Although various approaches described herein are described from a perspective of satellites in general, in some preferred approaches, LEO satellites are used. Because LEO satellites orbit the Earth relatively close to the Earth's surface, a direct microwave transmission from a user device to the LEO may be used in these techniques. For example, as will be described herein, LEO satellites may be used to transfer data directly from a user edge device. With the enablement of low orbit satellite data centers, and the mechanisms to send and receive the information from these LEO satellites directly via a communication network, a huge performance benefit is realized by the applications and communication devices that access data directly from LEO satellites. This is because a communication device is directly connected to LEO processing locations, the transmission latency is relatively low due to omitted interference of intermediate network components. Because LEO satellites are orbiting relatively close to the Earth's surface, they can be used for communication purposes where the device (mobile or internet-of-things (IoT) device) on Earth can connect directly to the LEO satellites for performing a data exchange, e.g., as opposed to Earth based evolved node Bs (eNodeBs). This allows a relatively faster data transmission between a network to communication devices because they are directly connected to a LEO satellite. Using these techniques, 5G and/or 6G capable mobile devices may be configured to possess a capability to connect to LEO satellite transceivers where the LEO satellites act as eNodeBs and serve the connection to the target endpoints.

As previously mentioned, LEO satellites revolve around the Earth at relatively lower altitudes than geo-stationary satellites, and hence LEO satellites are not stationary with respect to the Earth's movement. Because movement of LEO satellites can be observed from Earth, and LEO satellites are relatively much closer to Earth's surface, to maintain a rotation equilibrium, the speed of LEO satellites has an impact on a footprint region when the LEO satellites are used for direct connection purposes. For this reason, there may be multiple LEO satellites orbiting the plane which acts as a mesh to offer continuous coverage for an area. In such a LEO mesh, there may be multiple satellites orbiting at different altitudes and speeds for serving the collective objective of managing the coverage for a given geographical area. In some cases, a connectivity handler service, which is responsible for establishing connections to end target devices (mobile and/or IoT devices), may be located on one of the LEO satellites where all the devices will make the connection. This acts as a software implementation of eNodeB. When the satellite at which the connection is created orbits out of coverage, a handover to one or more other LEO satellites may be caused to occur. At this point, all the connections are moved to the one or more other LEO satellites, which then start servicing the connections (DTCH in case of 5G network).

In order to determine which satellite should process connection requests at a given time, techniques described herein collect information from a plurality of satellites, e.g., all LEO satellites in a LEO mesh, which are allowed to handle the connection request from user endpoints. The collected information may include, e.g., universal unique identifiers (UUIDs), software eNodeB IDs, other information that is generally static and can be derived from configuration parsing approaches that would become apparent to one of ordinary skill in the art upon reading the descriptions herein, etc. Once the information about satellites is received, the trajectory of individual satellites is determined and mapped against a validity of the event. To collect the information about the event timelines, the information, e.g., such as news feeds, other social media natural language parsing, etc., may be used. Accordingly, the defined timelines are gathered for mass gathering events like a procession. Additionally, in some approaches, these techniques may be, at least in part, user driven as well. For example, a user driver change that supplies an active lead time when the connection handover is not recommended may be collected during a parameter negotiation of DTHC channel creation with a satellite and a device. While creating the logical channel, the parameter about a non-handover timeline may be asked by the target, and in response to the inquiry, the user driver at the initiator may reply with critical timing when the connection handover is not recommended due to a determined relatively heavy workload. The timelines may be gathered and then mapped against the trajectory of the LEOs in the mesh that are available for connection handling in the trajectory.

As will be described in greater detail elsewhere below, in some approaches in which only one satellite is used to handle the connections and there are no overlapped regional satellites serving the same footprint region, connections may be made to available satellites for data processing. In contrast, in some approaches in which a determination is made that there is more than one satellite which serves the overlapped coverage region, the motion, trajectory, speed and the timeline requirements are preferably mapped to determine which satellite should accept the session. In this case, the satellite determined to have a maximum coverage timeline is preferably caused to accept the connection and start serving the workload. When the initiator requests the connection, e.g., via a CONN_REQUEST, the determined satellite, a trajectory motion may be calculated to determine a suitable candidate in the mesh of available satellites. In response to a determination that a current satellite is not a best possible satellite to serve the connection, the request is caused to be redirected to another satellite which has relatively more coverage footprint such that handover will not be needed. Then the peer satellite is instructed to accept the connection request(s) and perform further communications. Because connections from a device may be made to satellites having a maximum time available for the event (as compared to other satellites), handovers are minimized during the event and uninterrupted service is achieved. Accordingly, using the novel techniques described herein, relatively more data transfer requests are made and disconnects are avoided, thereby enabling a relatively better user experience than would otherwise be experienced as a result of the conventional techniques described elsewhere herein.

Now referring to FIG. 2, a flowchart of a method 200 is shown, according to one embodiment. The method 200 may be performed in accordance with the present invention in any of the environments depicted in FIGS. 1-6, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may be implemented in a known type of communication network that would become apparent to one of ordinary skill in the art upon reading the descriptions herein. For context, such a communication network may include a plurality of communication devices, e.g., computers, cellular phones, fax machines, network enabled tablets, etc. These communication devices may be user devices, e.g., nodes, that are used by one or more users. Furthermore, in some preferred approaches, the communication network may include one or more satellites that are, at least in some part of the satellite(s) orbit, configured to communicate with the communication devices. Note that although some approaches described herein refer to "satellites," in one or more of such approaches, at least one of the satellites is preferably a LEO satellite. One or more internet networks and/or private networks may additionally and/or alternatively be included in the communication network, and thereby, at least in some part of the satellite(s) orbit, configured to communicate with the satellite(s).

Communication within the network may, in some approaches, be, at least in part, performed using connection requests. Depending on the approach, connection requests of the devices may be directly and/or indirectly routed to one of the satellites and may include, e.g., monitoring internet of things (IoT) connection requests, fixed corporate network backhaul (alternative) connection requests, mobile network connection requests, mobile broadcast connection requests, backhaul connectivity connection requests, emergency communication connection requests, tracking related connection requests, remote community connection requests, power network connection requests, aeronautical broadband connection requests, remote control connection requests, etc. The connection request of a first device may be directly sent from the first devices to a first of the satellites. In another approach, the connection request of a first device may be indirectly sent from the first device to a second of the satellites, e.g., sent directly to the first satellite and the first satellite may handoff the connection request to the second satellite, sent from the first device to a known type of relay component on the Earth's surface that then outputs the connection request of the first device to the second satellite, etc.

In some approaches, method 200 includes initiating an instance of a proposed satellite eclipse identifier and movement arrangement. Upon instantiation, data structures may be loaded to a predetermined service instance. Furthermore, defined data collection resources may be triggered to send predetermined data streams, and one or more receiver data locations within the communication network may be identified and provisioned. For context, the predetermined "service instance" preferably includes a pool of satellite locations that can be used as a temporary home for the connection processing. A list of such locations and the capacities associated with the satellites, e.g., available resources for processing connection requests, may, in some approaches, be decoded from configuration parsing techniques that would become apparent to one of ordinary skill in the art upon reading the descriptions herein. Communication with application storage instances may additionally and/or alternatively be made and a status may be inquired from the targets, e.g., the satellites.

Predetermined required resource capitals may be provisioned for the service by causing predetermined insertions into softwarization management plane, and virtual network functions may be triggered to start the data transmission over one or more lines of the communication network. Infrastructure API instances of the satellites may be initiated in the initialization process of method 200. Handshaking may additionally and/or alternatively be caused, e.g., instructed via output instructions, to be performed that may further be used to transmit a data requirement signal and recognition of an event by an orchestration plane of the communication network.

Operation 202 includes obtaining satellite information associated with a plurality of satellites. For context, the satellite information may be obtained and used to determine physical parameters associated with the satellites as the satellites pass over geographical areas, e.g., see operation 204. For example, method 200 may include invoking the satellite infrastructure APIs in order to obtain physical parameters of the satellites of the communication network. In some other approaches, the satellite information may be parsed using techniques that would become apparent to one of ordinary skill in the art upon reading the descriptions herein for identifying predetermined physical parameter information. The physical parameters may depend on the approach. Various of such physical parameters associated with the satellite information may include, e.g., a current altitude, a footprint region, a trajectory, orbital plane information, an average moving speed, LEO satellite UUIDs, software eNodeB IDs, known types of static metadata which can be derived from configuration parsing approaches, etc. In some approaches, the physical parameters are determined with respect to the first geographical area, which may serve as a reference point at which the physical parameters may be observed for an associated one of the satellites. Note that the physical parameters may, in some approaches, be for eNodeBs of the satellite, e.g., connection request processing circuitry.

In some approaches, the satellite information may be received from the satellites, e.g., once, ongoingly, each time that a satellite comes into range of the communication network, etc. In some other approaches, a query may be issued to one or more of the satellites to determine such information. For example, in some approaches, the information from all the satellites in a predetermined mesh of satellites that are allowed, e.g., have previously received authorization credentials, to handle the connection request from user endpoints may be inquired, e.g., via queries. Note that the information of a given one of the satellites may, in some approaches, be reported by the given one of the satellites. However, in some other approaches, information of a first satellite may be provided by a second of the satellites, e.g., a first satellite may disclose information associated with the first satellite to a second satellite and the information associated with the first satellite may be received from the second satellite.

An optional operation of method 200 includes obtaining data associated with a plurality of internet based resources. The internet based resources may include, e.g., news sources, calendars, communication messages, social media sites, public websites, forums, etc. However, it should be noted that any information that is considered associated with a user and/or user communications is preferably only collected subsequent to gaining permission from the associated user(s). For example, this permission may be gained by such users accepting an opt-in clause where the users are free to retract such acceptance at any time and for any reason, e.g., opt-out. Operation 206 includes determining, from the data associated with a plurality of internet based resources, a future gathering event at a first geographical area. Note that the first geographical area may be defined by, e.g., all locations within a predetermined proximity of a predetermined landmark, a predetermined piece of public property, a predetermined piece of private property, an area within a boundary of predetermined streets, a predetermined park, etc. In some approaches, the future gathering event may be an event that is expected to cause an increase in connection requests being sent within the communication network. For example, in one approach, the future gathering event may be a mass gathering event that is scheduled and/or predicted to occur at the first geographical area. A "mass gathering" event may be defined as an event in which a plurality of users will be located within the first geographical area for a least some amount of time, e.g., a predetermined amount of time. This may include, e.g., a car show, a school gathering, a parade, a speaking event, a sports game, a reunion, etc. Based on the plurality of users gathering at the first geographical area, it may be determined that connection requests, e.g., output from user devices of the users at the gathering event, will increase with respect to an otherwise typical range of connection requests that are output from user devices located at the first geographical area. Accordingly, the determined future gathering event may be determined to be one in which a plurality of connection requests will be output from at least a predetermined threshold number of user devices located at a first geographical area.

In one illustrative approach, the process of collecting and using the information from various internet situated resources for proactive identification of the gathering events for which the connectivity needs to be assessed may, in some approaches, be performed in a trajectory footprint area of one or more of the satellites, e.g., locations that satellites in a predetermined mesh of satellites pass over. This way, areas that cannot otherwise be serviced by satellites, e.g., reception dead-zones, may be avoided. The information from news feeds, local events, etc., may be gathered and imposed on the footprint region, which will thereby provide information about planned mass gathering events in the region of inference. In some approaches, event timelines are gathered and saved into metadata mapper classes. This information may, in some approaches, be used for proactive spawning of the connection manager before the event. A natural language processing (NLP) processor may be used to extract the data associated with a plurality of internet based resources, e.g., the social media and location-based news feeds. This provides insight as to future gathering events and timelines for events where mass gathering is expected. According to various approaches, the NLP processor may implement one or more known techniques such as, e.g., raw language processing, entity extraction, relationship extraction, topic classification, sentiment analysis, etc., to extract such insights. This data associated with a plurality of internet based resources may, in some approaches, be extracted from news feed and thereafter saved to metadata mapper classes in response to a determination that the inference region belongs to the trajectory footprint.

It should be noted that, although various approaches described above, detail the determination of a future gathering event, in some approaches, various operations described herein may additionally and/or alternatively be performed with respect to an event in which at least one customer requires that connection requests from the first geographical area be uninterrupted for at least a predetermined period of time. In other words, it may be determined, from data received from one or more customer devices and/or from the data associated with a plurality of internet based resources, that at least some customer user devices at the first geographical area require that connection requests from such user devices be uninterrupted for at least a predetermined period of time. Various techniques for mitigating failure to fulfill connection requests are described in approaches below.

In order to ensure that connection requests do not go unfulfilled during the determined future gathering event, e.g., as a result of the sudden influx of communications being transmitted within the communication network, as a result of the occurrence of the future gathering event, one or more operations of method 200 may be performed to determine at least one of the satellites having an associated trajectory that passes over the first geographical area during the future gathering event. For example, it may be determined from the satellite information and/or the determined physical parameters whether any of the satellites will pass over the first geographical area during the time that the gathering event is expected to occur in the future, e.g., see operation 208. It should be noted that, in some approaches, the satellite may not pass directly "over" the first geographical area. Accordingly, the determination of operation 208 may, in some approaches, include determining at least one of the satellites that comes within a range of the first geographical area that allows for communication devices at the first geographical area to send connection requests to the satellite. It should also be noted that the gathering event may be mobile, in some approaches. Accordingly, coordinates of the first geographical area may change over time throughout the occurrence of the gathering event.

In some approaches, it may be determined that none of the satellites have an associated trajectory that passes over the first geographical area during the future gathering event. In response to such a determination, a notification may be output to a user device associated with an administrator that is responsible for overseeing connection requests of at least the first geographical area. The notification may indicate that a relative increase in connection requests is expected based on the determined future gathering event. The notification may additionally and/or alternatively indicate alternate suggestions of hardware configurations that may be used to accommodate and fulfill the expected relative increase in connection requests, e.g., recruiting of repeater components, hardline-signal based components, etc.

Various techniques for generating assignment instructions of connection requests that may be generated in response to a determination that at least one of the satellites has an associated trajectory that passes over the first geographical area during the future gathering event are described below.

Operation 210 includes generating, based on the physical parameters and the data, assignment instructions that specify which (one or more) of the satellites is to accept the plurality of connection requests from the first geographical area during the gathering event. In some approaches, generating the assignment instructions includes determining whether satellites determined to have trajectories that pass over the first geographical area during the future gathering event have at least a predetermined threshold of available resources for processing connection requests. The predetermined threshold may be dynamically set and applied in some approaches. For example, the predetermined threshold of available resources may, in some approaches, be a scalar multiple of a number of connection requests that are expected to be output from communication devices at the gathering event. In some approaches, the number of connection requests that are expected to be output may be determined by multiplying a predetermined number of connection requests by a number of communication devices, e.g., which may be one communication device per user expected to attend the gathering event, expected to be present at the gathering event. For context, just because a satellite is determined to pass over the first geographical area during the future gathering event does not mean that the satellite will have processing resources that allow the satellite to accept and fulfill at least some connection requests originating from communication devices at the gathering event. For example, the satellite may previously have committed to fulfilling connection requests from a second geographical area, and thereby have no remaining processing resources available. Accordingly, in one or more of such approaches, method 200 includes incorporating the satellites determined to have trajectories that pass over the first geographical area during the future gathering event and that also are determined to have at least the predetermined threshold of available resources for processing connection requests into the assignment instructions.

In some approaches, user imposed events may be detected while generating the assignment instructions. For example, in some approaches, changes of an initiator user driver may be made to supply an active lead time, e.g., prior to the gathering event, prior to a communication request being output, prior to a period of time that uninterrupted signals for connection requests are needed, etc. This lead time may in some approaches be before, or at a time of parameter negotiation of DTCH creation with a satellite. A device may send an active workload time, and this may be treated as non-handover period. In some approaches, in response to receiving the active worktime, the user driver at the initiator may reply with a critical timing when the connection handover is not recommended. Subsequent to gathering timelines and information associated therewith, these timelines, which may include the critical timing, may be mapped against the trajectory of the satellites in the mesh which are available for connection handling in the trajectory.

A determination may be made, in some approaches, that only a first of the satellites is determined to have a trajectory that passes over the first geographical area during the future gathering event. Accordingly, the single satellite may be the only satellite that is available to handle the connection requests and there are no overlapped regional satellites serving the same footprint region. In response to determining that only the first of the satellites has a trajectory that passes over the first geographical area during the future gathering event, the assignment instructions preferably instruct the first satellite to accept all of the plurality of connection requests from the first geographical area during the gathering event for data processing.

In contrast to the approach above in which only a single satellite is determined, in some other approaches, a determination may be made that at least a first of the satellites and a second of the satellites have trajectories that pass over the first geographical area during the future gathering event. It may additionally and/or alternatively be determined that such a plurality of satellites have at least the predetermined threshold of available resources for processing connection requests. In some approaches, the connection requests may be distributed in the assignment instructions. For example, the connection requests may be distributed in the assignment instructions to the determined plurality of satellites according to a predetermined condition. For example, the predetermined condition may specify that the connection requests be proportionally assigned to the determined satellites, e.g., proportional to an amount of time that each satellite is passing over the gathering event, proportional to an amount of resources that each satellite has for fulfilling connection requests, etc.

In some other approaches in which a plurality of the satellites are determined to have trajectories that pass over the first geographical area during the future gathering event, generating the assignment instructions may include determining, from the physical parameters and/or the data, which of the first satellite and the second satellite will be able to accept the plurality of connection requests from the first geographical area during the gathering event for a relatively longer period of time. In one or more of such approaches, the assignment instructions may be caused to specify that the one of first satellite and the second satellite determined to be able to accept the plurality of connection requests from the first geographical area during the gathering event for the relatively longer period of time. In other words, the satellite determined to be capable of accepting the plurality of connection requests from the first geographical area during the gathering event for a relatively longer period of time is preferably specified in the assignment instructions to serve the connection requests. This assignment thereby reduces connection request handovers during the gathering event because satellites having a trajectory that allows the satellite to accept connection requests for a relatively longer period of time are prioritized over satellites having a trajectory that does not allow the satellite to accept connection requests for a relatively longer period of time. This thereby enables an uninterrupted service which translates to a relatively better user experience.

Another factor that may be considered when generating the assignment instructions is that different satellites may have a trajectories that position the satellites over the first geographical area during different temporal portions of the gathering event. This means that at least some of the satellites with trajectories that position the satellites over the first geographical area during the gathering event may not be able to receive connection requests for the entirety of the gathering event. Accordingly, generating the assignment instructions may include determining, for an entire temporal length of the gathering event, at least one satellite to be assigned the connection requests. For example, a determination may be made that the trajectory of a first satellite positions the first satellite to accept the plurality of connection requests from the first geographical area for a first temporal portion of the gathering event, and that a trajectory of a second satellite positions the second satellite to accept the plurality of connection requests from the first geographical area for a second temporal portion of the gathering event. Note that depending on the approach, the first temporal portion and the second temporal portion may or may not overlap. In some approaches, based on the trajectory determinations, method 200 may include causing the assignment instructions to specify that the first satellite accept the plurality of connection requests from the first geographical area for the first temporal portion of the gathering event. Furthermore, the assignment instructions may be caused to specify that the second satellite accept the plurality of connection requests from the first geographical area for the second temporal portion of the gathering event.

In some approaches, the assignment instructions may specify for how long the specified satellites are to accept the plurality of connection requests. In some other approaches, the method 200 may additionally and/or alternatively include causing, e.g., instructing in the assignment instructions, the first satellite to handoff the plurality of connection requests, e.g., active and/or unfulfilled connection requests, to the second satellite at the second temporal portion of the gathering event. For example, upon an initiator, e.g., requesting communication device, requesting for a connection, e.g., via a CONN_REQUEST, to one of the satellites, a calculation may be made with respect to the trajectory motion of the satellites to determine a suitable candidate in the mesh of satellites. In response to a determination that a satellite currently within communication range of the gathering event is not the best possible satellite to serve the connection, e.g., a peer satellite is determined to be available for a relatively longer period of the gathering event, the satellite may be caused, e.g., instructed in the assignment instructions, to redirect the request to the other peer satellite which has more coverage footprint and/or coverage time. The peer satellite will thereby be caused to accept the connection request and perform a workload associated with the communication request.

Operation 212 includes outputting the assignment instructions for preventing the connection requests from going unfulfilled during the gathering event. Upon receiving the assignment instructions, the indicated satellites may be caused, e.g., by the instructions, to accept the connection requests and begin serving a workload associated with the connection requests.

Various benefits are enabled as a result of implementing the techniques of embodiments and approaches described herein. For example, the techniques used herein may be implemented in order to dynamically sense the need of critical workload transfer to satellites based on collected input streams, and autonomously provision an additional saving location for more data security. Accordingly, the techniques described herein improve the field of communication by relatively increasing throughput proficiencies and data security. Furthermore, by identify the location, trajectory, events described herein, customers are proactively provided with communication resources ahead of events to prevent connection request failures which would otherwise occur if such gathering events were not prepared for using the techniques described herein. Accordingly, these techniques relatively improve the field of communications by reducing processing that would otherwise be performed as a result of connection requests failing. For example, the compounding problems described elsewhere above experienced in conventional communication networks are mitigated as a result of the implementation of the novel techniques described herein. Furthermore, these techniques leverages direct data connection to satellite eNodeBs during mass gathering events, and avoid connection loss during mass gatherings by balancing workloads associated with connection requests in order to proactively provide an uninterrupted service.

Figure 3:
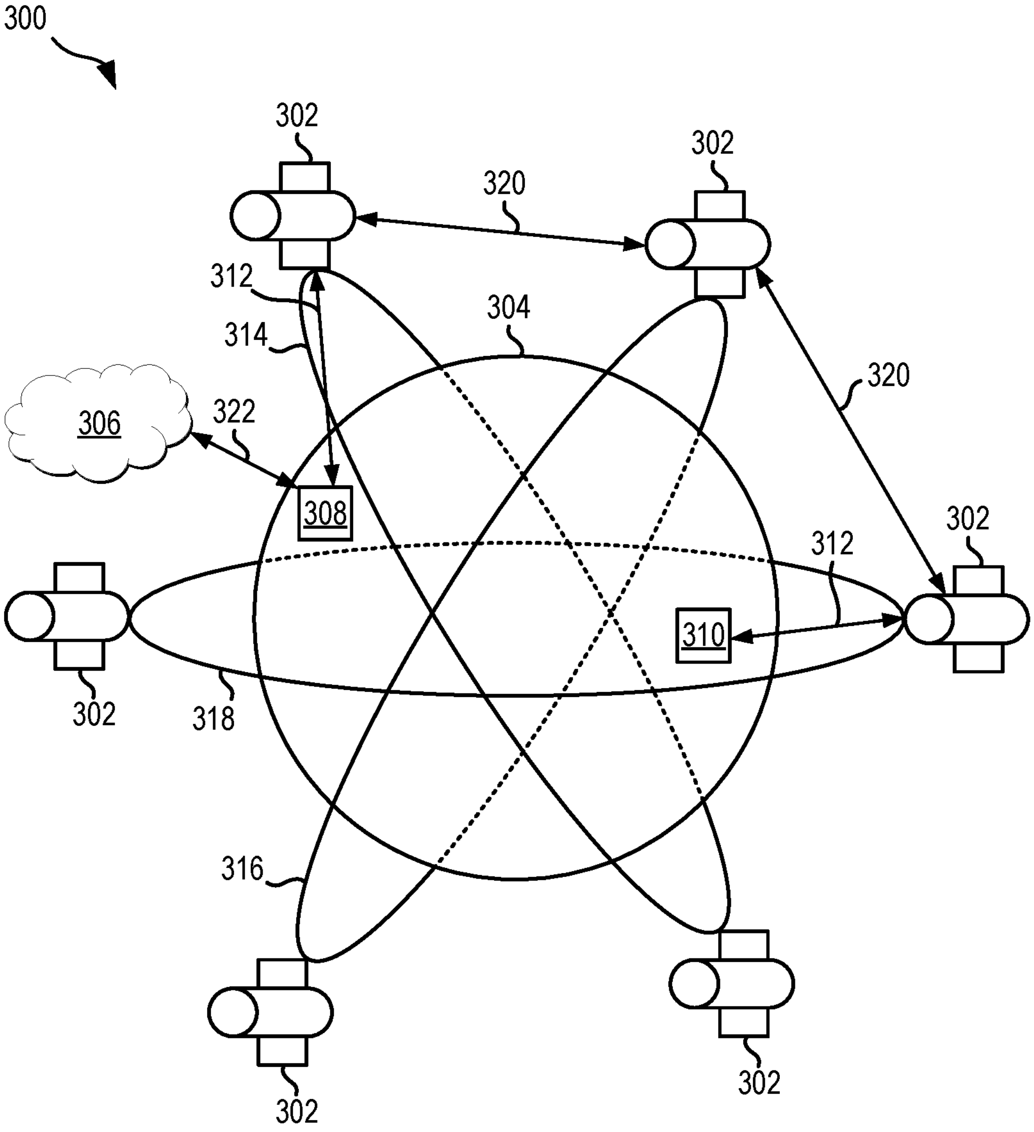
FIG. 3 is a representation of a communication network, in accordance with one embodiment of the present invention.

FIG. 3 depicts a communication network 300, in accordance with one embodiment. As an option, the present communication network 300 may be implemented in conjunction with features from any other embodiment listed herein, such as those described with reference to the other FIGS. Of course, however, such communication network 300 and others presented herein may be used in various applications and/or in permutations which may or may not be specifically described in the illustrative embodiments listed herein. Further, the communication network 300 presented herein may be used in any desired environment.

The communication network 300 is based on communications that occur on Earth 304. The communication network 300 includes a plurality of satellites 302, which may be LEO satellites. Satellite information associated with the satellites 302 may be obtained. For example, at least one of the satellites may relay such information to other satellites via communication signals 320, and at least one of the satellites may output the satellite information to a satellite control and management ground junction component 308 and/or a field component 310, e.g., see operations 312. At least some of the satellite information may additionally and/or alternatively be received and/or output to an internet and/or private network 306, e.g., see operation 322. The satellite information may be used to determine physical parameters associated with the satellites as the satellites pass over geographical areas. For example, trajectories 314, 316, 318 of the satellites may be determined using techniques described in method 200.

A future gathering event at a first geographical area in which a plurality of connection requests will be output from user devices located at a first geographical area may be determined based on data associated with the plurality of internet based resources. Furthermore, assignment instructions that specify which of the satellites is to accept the plurality of connection requests from the first geographical area during the gathering event may be generated based on the physical parameters and the data. In some approaches, techniques described elsewhere herein may be performed in order to generate the assignment instructions. The assignment instructions are output for preventing the connection requests from going unfulfilled during the gathering event, e.g., using the communication paths used for receiving satellite information.

Figure 4:
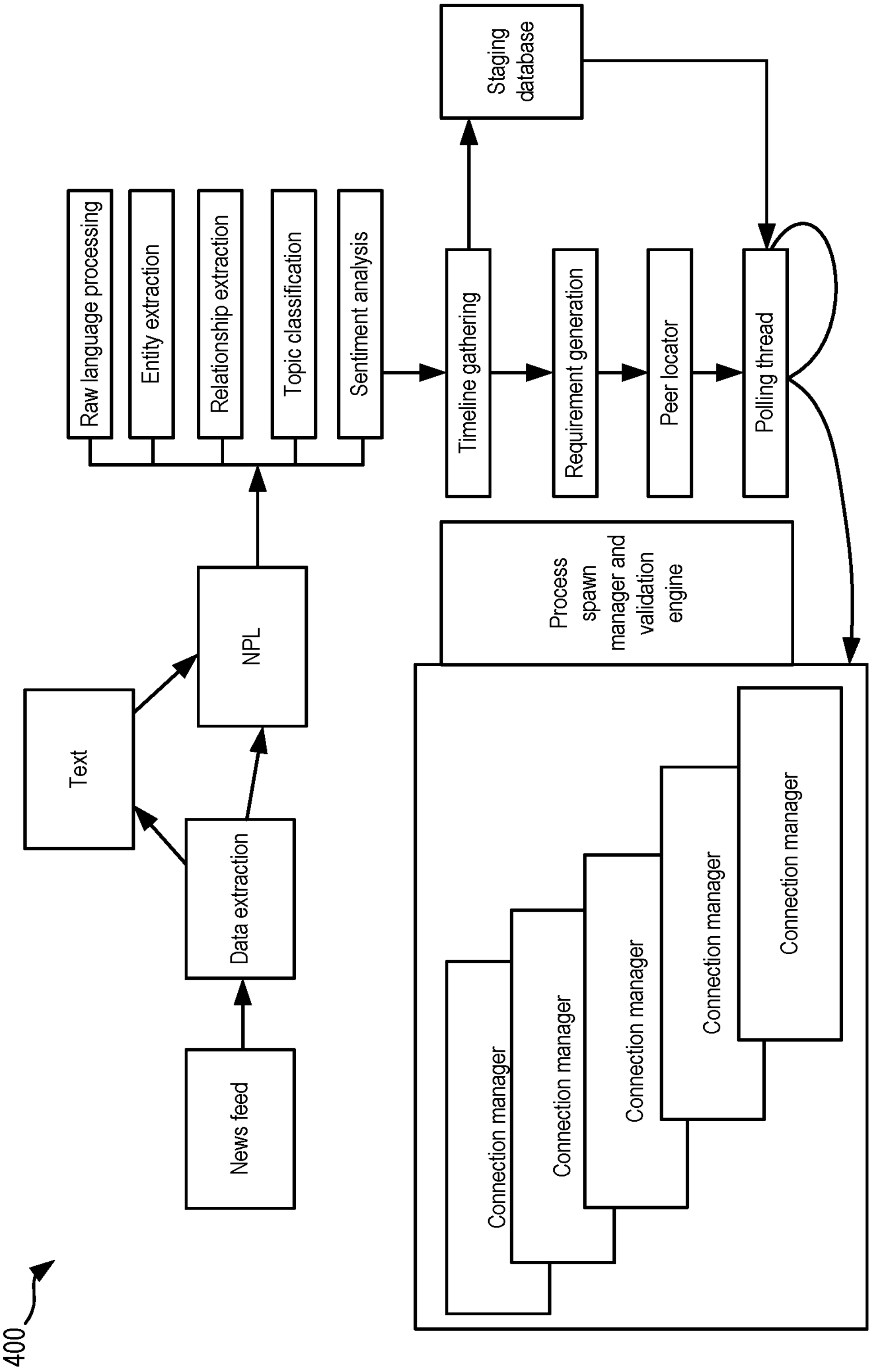
FIG. 4 is a flowchart of a method, in accordance with one embodiment of the present invention.

Now referring to FIG. 4, a flowchart of a method 400 is shown according to one embodiment. The method 400 may be performed in accordance with the present invention in any of the environments depicted in FIGS. 1-6, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

For context, it may be prefaced that FIG. 4 includes a flowchart of operations that may be performed in order to determine, from data associated with a plurality of internet based resources, a future gathering event at a first geographical area in which a plurality of connection requests will be output from user devices located at a first geographical area. The internet based resources may, in some approaches, include predetermined news sources, e.g., see news feed. Data extraction performed on such news sources may include text based extraction techniques and/or natural language processing techniques that would become apparent to one of ordinary skill in the art upon reading the descriptions herein. These techniques may, in some approaches, include performing, e.g., raw language processing, entity extraction, relationship extraction, topic classification, sentiment analysis, etc.

Physical parameters associated with satellites and/or data associated with the plurality of internet based resources may, in some approaches, be used to generate assignment instructions that specify which of the satellites is to accept the plurality of connection requests from the first geographical area during the future gathering event. In some approaches, this generation may include performing timeline gathering that reveals trajectories of the satellites with respect to the gathering event. In some approaches, information associated with the timeline gathering may be, at least temporarily, stored in a predetermined staging database, which may be input into a polling thread. In some other approaches, this generation may additionally and/or alternatively include requirement generation in which client requirements for periods of uninterrupted signal are determined and incorporated into the assignment instructions. Furthermore, in some approaches, this generation may include performing predetermined peer locator operations in which it is determined which satellites will be able to handoff to other satellites. A polling thread may additionally and/or alternatively be used to determine information from the satellites that is used to determine the physical parameters.

The assignment instructions may be caused to be performed and/or output to the satellites. For example, in one approach, the assignment instructions are provided to a collection of connection managers for causing the assignments to be performed. The collection of connection managers may, in some approaches, include a process spawn engine and/or a validation engine of a type that would become apparent to one of ordinary skill in the art upon reading the descriptions herein.

Figure 5:
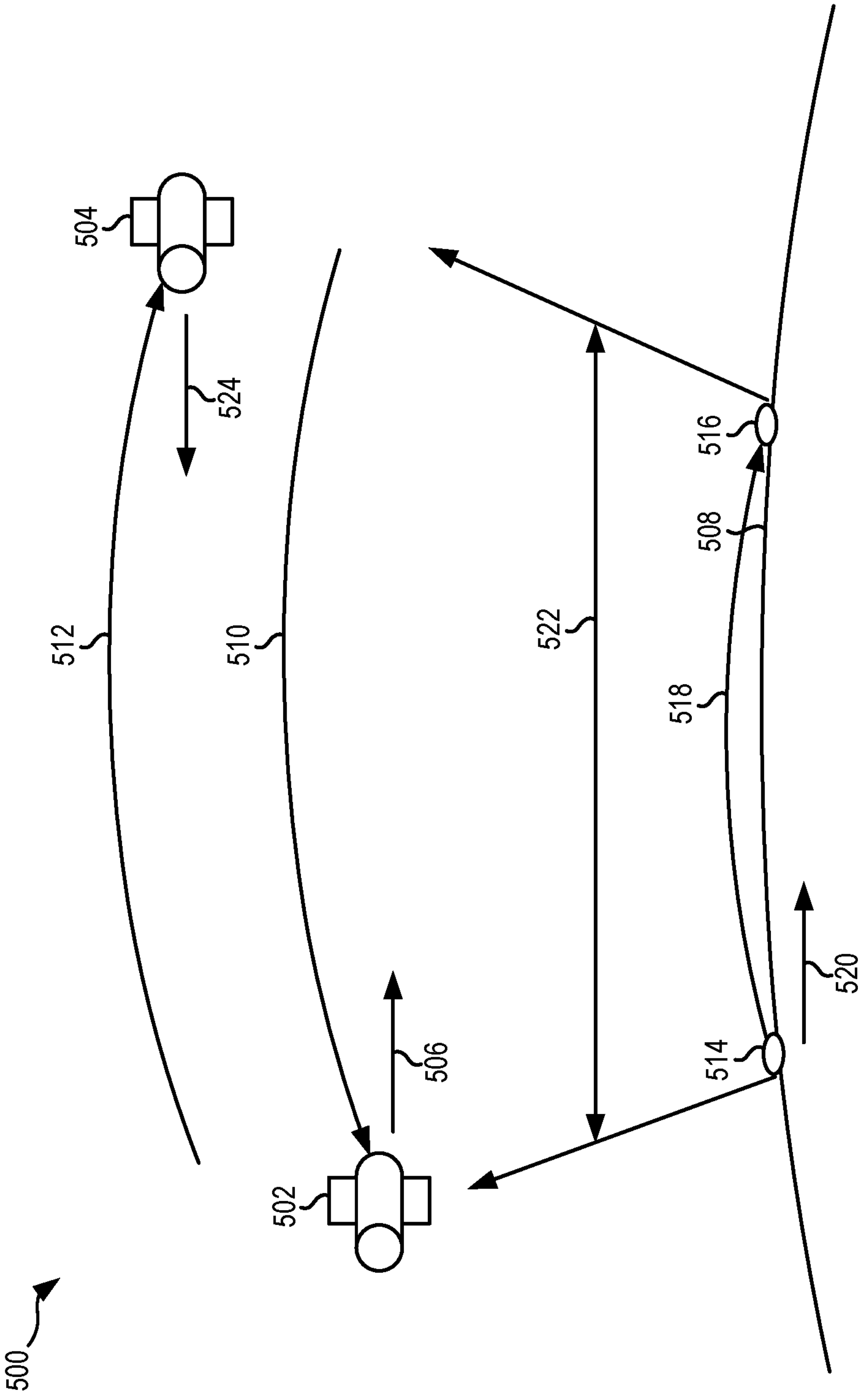
FIG. 5 is a representation of a communication network, in accordance with one embodiment of the present invention.

FIG. 5 depicts a representation of a communication network 500, in accordance with one embodiment. As an option, the present communication network 500 may be implemented in conjunction with features from any other embodiment listed herein, such as those described with reference to the other FIGS. Of course, however, such communication network 500 and others presented herein may be used in various applications and/or in permutations which may or may not be specifically described in the illustrative embodiments listed herein. Further, the communication network 500 presented herein may be used in any desired environment.

The communication network 500 includes a plurality of satellites. For example, a first satellite 502 is traveling in a first direction 506 over Earth's surface 508. The first direction travels along an orbital path 510, which may be a LEO in some approaches. Similarly, a second satellite 504 is traveling in a second direction 524 over Earth's surface 508. The second direction travels along an orbital path 512, which may be a LEO in some approaches.

A future gathering event at a first geographical area may be determined. In some approaches, the satellites may be able to receive connection requests from the first geographical area while orbiting over the first geographical area. The future gathering event may be a procession that begins at a starting location 514 of the first geographical area and proceeds in a third direction 520 to an ending location 516 of the first geographical area along a procession route 518. Along the route, a plurality of connection requests may be output from user devices located at the first geographical area. It may be determined which of the satellites should be assigned to accept and fulfill the connection requests. For example, assignment instructions may be generated that specify which of the satellites is to accept the plurality of connection requests from the first geographical area during the gathering event.

In order to generate the assignment instructions, in some approaches, satellite information associated with a plurality of satellites may be obtained and used to determine physical parameters associated with the satellites as the satellites pass over the first geographical area. For example, such information may be used to determine that a footprint of coverage timeline of the first satellite 502 over the first geographical area occurs from 9:00 AM to 1:00 PM during the future gathering event, and a footprint of coverage timeline of the second satellite 504 over the first geographical area occurs from 8:00 AM to 11:00 AM during the future gathering event along an inference footprint region 522. Assuming that the procession is established to occur from 10:00 AM to 12:00 PM, a determination may be made that a footprint coverage requirement timeline is from 10:00 AM to 12:00 PM. Based on this determination, the assignment instructions may be caused to specify that the first satellite 502 is to accept the plurality of connection requests from the first geographical area during the procession, as the footprint coverage timeline of the second satellite 504 does extend past 11:00 AM.

Figure 6:
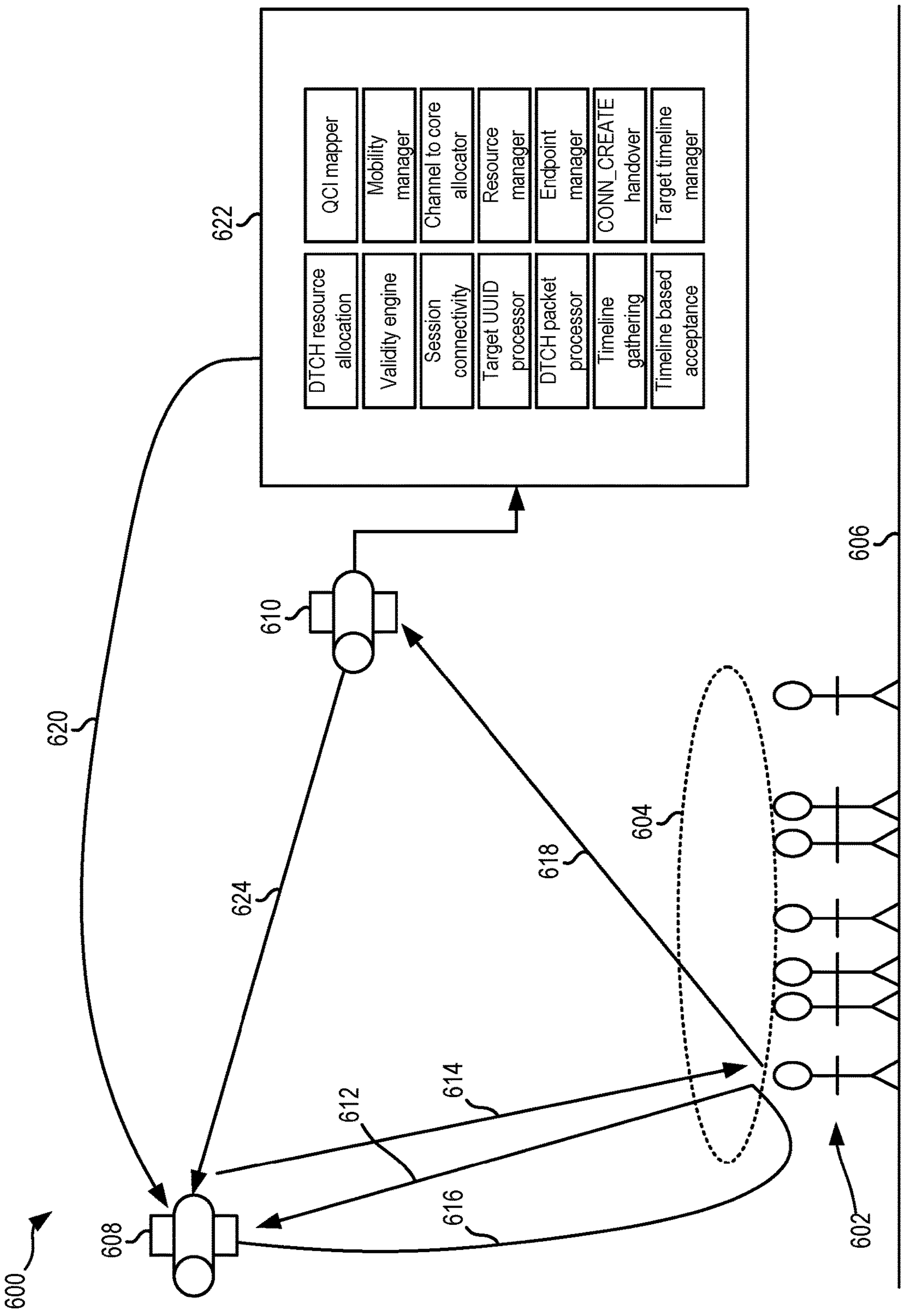
FIG. 6 is a representation of a communication network, in accordance with one embodiment of the present invention.

FIG. 6 depicts a representation of a communication network 600, in accordance with one embodiment. As an option, the present communication network 600 may be implemented in conjunction with features from any other embodiment listed herein, such as those described with reference to the other FIGS. Of course, however, such communication network 600 and others presented herein may be used in various applications and/or in permutations which may or may not be specifically described in the illustrative embodiments listed herein. Further, the communication network 600 presented herein may be used in any desired environment.

For context, it may be prefaced that while FIG. 5 illustrates a process of generating assignment instructions, FIG.

6 illustrates implementation of generated assignment instructions during a gathering event, in accordance with one approach.

Communication network 600 includes a procession of people at a first geographical area 604 on Earth's surface 606. It may be assumed that assignment instructions instruct a first satellite 608 to accept a plurality of connection requests from the first geographical area 604 during the gathering event. For example, output operation 612 illustrates connection requests being output to the first satellite 608, and operation 614 illustrates a connection response that accepts the connection requests and a workload associated therewith to thereby establish a connection 616.

In some approaches, a second satellite 610 may have been caused to accept connection requests previously, e.g., see DTCH_CONN_CREATE operation 618. However, the generated assignment instructions may specify when the second satellite 610 is to handover connection requests to the first satellite 608 during the gathering event, e.g., see handover operation 620 and connection transfer operation 624 that hands connection requests to the first satellite according to coverage timelines of the generated assignment instructions. This handover operation may be caused to be performed by a connection manager in some approaches, e.g., see connection manager 622. The connection manager may have access to information associated with the satellites and/or components used to determine physical parameters associated with the satellites, e.g., see QCI mapper, validity engine, mobility manager, etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

obtaining by a connection manager, satellite information associated with a plurality of satellites, the connection manager having components configured to determine physical parameters associated with the satellites;

using, by the connection manager, the satellite information to determine the physical parameters associated with the satellites as the satellites pass over geographical areas;

determining, by the connection manager, from data associated with a plurality of internet based resources, a future gathering event at a first geographical area in which a plurality of direct connection requests will be output from cellular user devices of users on Earth's surface within the first geographical area, wherein the determining, by the connection manager, from the data associated with the plurality of internet based resources, the future gathering event comprises: using sentiment analysis and entity extraction on the data associated with a plurality of internet based resources to extract insights about the future gathering event, wherein the future gathering event is determined based on the extract insights;

determining, by the connection manager, from the data, which of the satellites have trajectories that pass over the first geographical area during the future gathering event;

generating, by the connection manager, based on the physical parameters and the data, assignment instructions that specify which of the satellites is to accept the plurality of direct connection requests from the first geographical area during the future gathering event;

outputting, by the connection manager, the assignment instructions for preventing the direct connection requests from going unfulfilled during the future gathering event, wherein the cellular user devices remain located at the first geographical area throughout a defined timeline of the future gathering event; and in response to a determination that none of the satellites have an associated trajectory that passes over the first geographical area during the future gathering event, outputting, by the connection manager, a notification to a user device associated with an administrator that is responsible for overseeing connection requests of the first geographical area, wherein the notification indicates alternate suggestions of hardware configurations to use to accommodate and fulfill connection requests during the future gathering event, wherein the alternate suggestions of hardware configurations include recruiting of repeater components and hardline-signal based components.

2. The computer-implemented method of claim 1, wherein at least one of the satellites is a low Earth orbit (LEO) satellite.

3. The computer-implemented method of claim 1, wherein the physical parameters are selected from the group consisting of: a current altitude, orbital plane information and an average moving speed.

4. The computer-implemented method of claim 1, wherein generating the assignment instructions includes: determining whether satellites determined to have trajectories that pass over the first geographical area during the future gathering event have at least a predetermined threshold of available resources for processing direct connection requests, and comprising: incorporating by the connection manager, the satellites determined to have trajectories that pass over the first geographical area during the future gathering event and determined to have at least the predetermined threshold of available resources for processing direct connection requests into the assignment instructions.

5. The computer-implemented method of claim 4, wherein only a first of the satellites is determined to have a trajectory that passes over the first geographical area during the future gathering event, wherein the assignment instructions instruct the first satellite to accept the plurality of direct connection requests from the first geographical area during the gathering event.

6. The computer-implemented method of claim 4, wherein at least a first of the satellites and a second of the satellites are determined to have trajectories that pass over the first geographical area during the future gathering event and are determined to have at least the predetermined threshold of available resources for processing direct connection requests.

7. The computer-implemented method of claim 6, wherein generating the assignment instructions includes: determining which of the first satellite and the second satellite will be able to accept the plurality of direct connection requests from the first geographical area during the gathering event for a relatively longer period of time, and causing the assignment instructions to specify the one of first satellite and the second satellite determined to be able to accept the plurality of direct connection requests from the first geographical area during the gathering event for the relatively longer period of time to thereby reduce direct connection request handovers during the gathering event.

8. The computer-implemented method of claim 6, wherein a determination is made that a trajectory of the first satellite positions the first satellite to accept the plurality of direct connection requests from the first geographical area for a first temporal portion of the gathering event, wherein a determination is made that a trajectory of the second satellite positions the second satellite to accept the plurality of direct connection requests from the first geographical area for a second temporal portion of the gathering event, and comprising: based on the trajectory determinations, causing, by the connection manager, the assignment instructions to specify that the first satellite accept the plurality of direct connection requests from the first geographical area for the first temporal portion of the gathering event.

9. The computer-implemented method of claim 8, comprising: causing, by the connection manager, the first satellite to handoff the plurality of direct connection requests to the second satellite at the second temporal portion of the gathering event, wherein the gathering event is selected from the group consisting of: a car show, a school gathering, a parade, a speaking event, a sports game, and a reunion.

10. A computer program product, the computer program product comprising a computer readable storage medium having program instructions embodied therewith, the program instructions readable and/or executable by a computer to cause the computer to:

obtain, by the computer, satellite information associated with a plurality of satellites;

use, by the computer, the satellite information to determine physical parameters associated with the satellites as the satellites pass over geographical areas;

determine, by the computer, from data associated with a plurality of internet based resources, a future gathering event at a first geographical area in which a plurality of direct connection requests will be output from cellular user devices of users on Earth's surface within the first geographical area, wherein the determining, by the computer, from the data associated with the plurality of internet based resources, the future gathering event comprises: using sentiment analysis and entity extraction on the data associated with a plurality of internet based resources to extract insights about the future gathering event, wherein the future gathering event is determined based on the extract insights;

determining, by the connection manager, from the data, which of the satellites have trajectories that pass over the first geographical area during the future gathering event;

generate, by the computer, based on the physical parameters and the data, assignment instructions that specify which of the satellites is to accept the plurality of direct connection requests from the first geographical area during the future gathering event;

output, by the computer, the assignment instructions for preventing the direct connection requests from going unfulfilled during the future gathering event, wherein the cellular user devices remain located at the first geographical area throughout a defined timeline of the future gathering event; and in response to a determination that none of the satellites have an associated trajectory that passes over the first geographical area during the future gathering event, output, by the computer, a notification to a user device associated with an administrator that is responsible for overseeing connection requests of the first geographical area, wherein the notification indicates alternate suggestions of hardware configurations to use to accommodate and fulfill connection requests during the future gathering event, wherein the alternate suggestions of hardware configurations include recruiting of repeater components and hardline-signal based components.

11. The computer program product of claim 10, wherein at least one of the satellites is a low Earth orbit (LEO) satellite.

12. The computer program product of claim 10, wherein the physical parameters are selected from the group consisting of: a current altitude, orbital plane information and an average moving speed.

13. The computer program product of claim 10, wherein generating the assignment instructions includes: determining whether satellites determined to have trajectories that pass over the first geographical area during the future gathering event have at least a predetermined threshold of available resources for processing direct connection requests, and the program instructions readable and/or executable by a computer to cause the computer to: incorporate, by the computer, the satellites determined to have trajectories that pass over the first geographical area during the future gathering event and determined to have at least the predetermined threshold of available resources for processing direct connection requests into the assignment instructions.

14. The computer program product of claim 13, wherein only a first of the satellites is determined to have a trajectory that passes over the first geographical area during the future gathering event, wherein the assignment instructions instruct the first satellite to accept the plurality of direct connection requests from the first geographical area during the gathering event.

15. The computer program product of claim 13, wherein at least a first of the satellites and a second of the satellites are determined to have trajectories that pass over the first geographical area during the future gathering event and are determined to have at least the predetermined threshold of available resources for processing direct connection requests.

16. The computer program product of claim 15, wherein generating the assignment instructions includes: determining which of the first satellite and the second satellite will be able to accept the plurality of direct connection requests from the first geographical area during the gathering event for a relatively longer period of time, and causing the assignment instructions to specify the one of first satellite and the second satellite determined to be able to accept the plurality of direct connection requests from the first geographical area during the gathering event for the relatively longer period of time to thereby reduce direct connection request handovers during the gathering event.

17. The computer program product of claim 15, wherein a determination is made that a trajectory of the first satellite positions the first satellite to accept the plurality of direct connection requests from the first geographical area for a first temporal portion of the gathering event, wherein a determination is made that a trajectory of the second satellite positions the second satellite to accept the plurality of direct connection requests from the first geographical area for a second temporal portion of the gathering event, and comprising: the program instructions readable and/or executable by the computer to cause the computer to: based on the trajectory determinations, cause, by the computer, the assignment instructions to specify that the first satellite accept the plurality of direct connection requests from the first geographical area for the first temporal portion of the gathering event.

18. The computer program product of claim 17, comprising: the program instructions readable and/or executable by the computer to cause the computer to: cause, by the computer, the first satellite to handoff the plurality of direct connection requests to the second satellite at the second temporal portion of the gathering event, wherein the gathering event is selected from the group consisting of: a car show, a school gathering, a parade, a speaking event, a sports game, and a reunion.

19. A system, comprising:

a connection manager having components configured to determine physical parameters associated with a plurality of satellites, wherein the connection manager includes a processor; and logic integrated with the processor, executable by the processor, or integrated with and executable by the processor, the logic being configured to:

obtain satellite information associated with a plurality of satellites;

use the satellite information to determine physical parameters associated with the satellites as the satellites pass over geographical areas;

determine, from data associated with a plurality of internet based resources, a future gathering event at a first geographical area in which a plurality of direct connection requests will be output from cellular user devices of users on Earth's surface within the first geographical area, wherein the determining from the data associated with the plurality of internet based resources, the future gathering event comprises: using sentiment analysis and entity extraction on the data associated with a plurality of internet based resources to extract insights about the future gathering event, wherein the future gathering event is determined based on the extract insights;

determine, from the data, which of the satellites have trajectories that pass over the first geographical area during the future gathering event;

generate, based on the physical parameters and the data, assignment instructions that specify which of the satellites is to accept the plurality of direct connection requests from the first geographical area during the future gathering event;

output the assignment instructions for preventing the direct connection requests from going unfulfilled during the future gathering event, wherein the cellular user devices remain located at the first geographical area throughout a defined timeline of the future gathering event; and in response to a determination that none of the satellites have an associated trajectory that passes over the first geographical area during the future gathering event, outputting, by the connection manager, a notification to a user device associated with an administrator that is responsible for overseeing connection requests of the first geographical area, wherein the notification indicates alternate suggestions of hardware configurations to use to accommodate and fulfill connection requests during the future gathering event, wherein the alternate suggestions of hardware configurations include recruiting of repeater components and hardline-signal based components.

20. The system of claim 19, wherein at least one of the satellites is a low Earth orbit (LEO) satellite.

* * * * *